INVENTOR.
HUGH L. ROGERS
BY John H. Leonard,
ATTORNEY.

March 28, 1939.    H. L ROGERS    2,152,442
BRAKE APPLYING AND EQUALIZING MECHANISM
FOR UNIVERSAL ROCKING WHEEL VEHICLES
Filed Dec. 24, 1937    3 Sheets-Sheet 3

INVENTOR.
HUGH L. ROGERS
BY
ATTORNEY.

Patented Mar. 28, 1939

2,152,442

UNITED STATES PATENT OFFICE 2,152,442

BRAKE APPLYING AND EQUALIZING MECHANISM FOR UNIVERSAL ROCKING WHEEL VEHICLES

Hugh L. Rogers, Albion, Pa., assignor to The Rogers Brothers Corporation, Albion, Pa.

Application December 24, 1937, Serial No. 181,542

9 Claims. (Cl. 188—2)

This invention relates to a brake applying and equalizing mechanism for universal rocking wheel vehicles employing multiple rocking axles, such as heavy duty trailers and the like having fore and aft sets of rear wheels, which sets are arranged to rock about a transverse axis and in which the wheels of each set are arranged to rock about a longitudinally extending axis concurrently with the rocking of the sets about the transverse axis.

For the purposes of illustration, the invention will be described in connection with a heavy duty, eight-wheel trailer in which eight dual wheels are arranged in two transversely extending rows at the rear of the trailer, each row including four dual wheels, and the rows being spaced from each other longitudinally of the trailer.

In heavy duty vehicles or trailers of this character, very great braking pressure is required because of the loads of many tons which are carried at relatively high speeds by the trailers. These loads are such that the tractor or truck to which the trailer is connected has inadequate braking power to stop the loaded trailer once the trailer is in motion. It is necessary also that each wheel of the trailer vehicle be capable of exerting the same amount of frictional resistance as every other wheel upon the application of braking pressure because unequal braking power on the respective wheels causes skidding of the trailer and shifting of the load.

Heretofore, when such a large number of universal rocking wheels have been provided, the brakes have been operated by flexible cables, so that compensation for the relative changes in position of the wheels with respect to each other can be compensated. Such a mechanism is illustrated and described in United States Letters Patent No. 1,905,242, issued to Charles A. Rogers, et al., on April 25, 1933. After very short periods of use, the cables stretch so that the original throw of the brake applying mechanism is insufficient to fully apply the brakes. Since this may happen suddenly and unexpectedly, the braking system is rendered unsafe and unreliable. Again, in such cable operated braking systems, the sheaves for the cables must be placed on the underside of the trailer where they are subjected to and accumulate large amounts of snow and ice along with road grit and the like. This not only causes extreme wear on the sheaves and cables, but often causes jamming and binding of one or more of the cables with the result that often braking pressure cannot be applied, and, if applied, is not applied equally on all wheels.

It is desirable, therefore, that a more positive and equalized braking system be provided and that the braking system maintain its original setting throughout long periods of use and operate under the unfavorable roadway conditions without any appreciable wear and variation, and with assured and equalized operation at all times regardless of the relative positions into which the wheels have rocked at the particular instant. This necessitates the use of stiff rods or positive coupling elements, and the problem which is presented is to compensate for the various rocking movements of the wheels and sets of wheels while maintaining a rigid and positive connection among the operating parts of the brake applying and equalizing mechanism.

One of the principal objects of the present invention is to provide a brake applying and equalizing mechanism for universal rocking wheels of the character described in which all brake rods, levers and the like are sufficiently rigid and heavy to operate without danger of stretching, buckling and the like and in which, with such rigid parts, equalized braking pressure may be applied on all wheels of the vehicle regardless of the tilting of the wheels of any set about their longitudinal rocking axis or the tilt of the sets of wheels with respect to each other about a transverse axis, or the concurrent tilting of both the sets of wheels and of the wheels of each set.

Another object is to provide a brake applying and equalizing mechanism of this character wherein all of the parts are extremely durable and rugged and the mechanism itself extremely simple.

A more specific object is to provide a brake applying and equalizing mechanism of this character which may readily be detached in part to permit ready access to the wheels or sets of wheels for the purposes of servicing the wheels and replacing the wheels or tires.

Other objects and advantages will become apparent from the following specification wherein reference is made to the drawings, in which.

Figure 1:
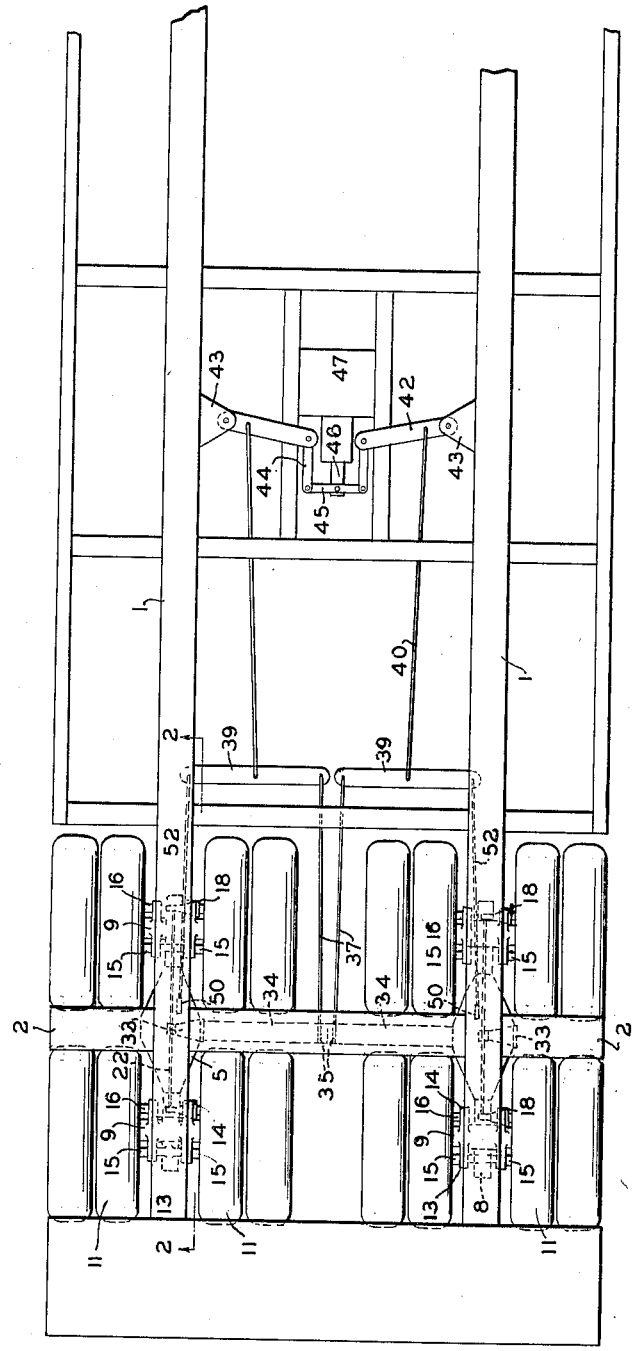
Fig. 1 is a fragmentary top plan view of a trailer having eight universal rocking wheels and the mechanism of the present invention installed thereon.
Figures 2, 3:
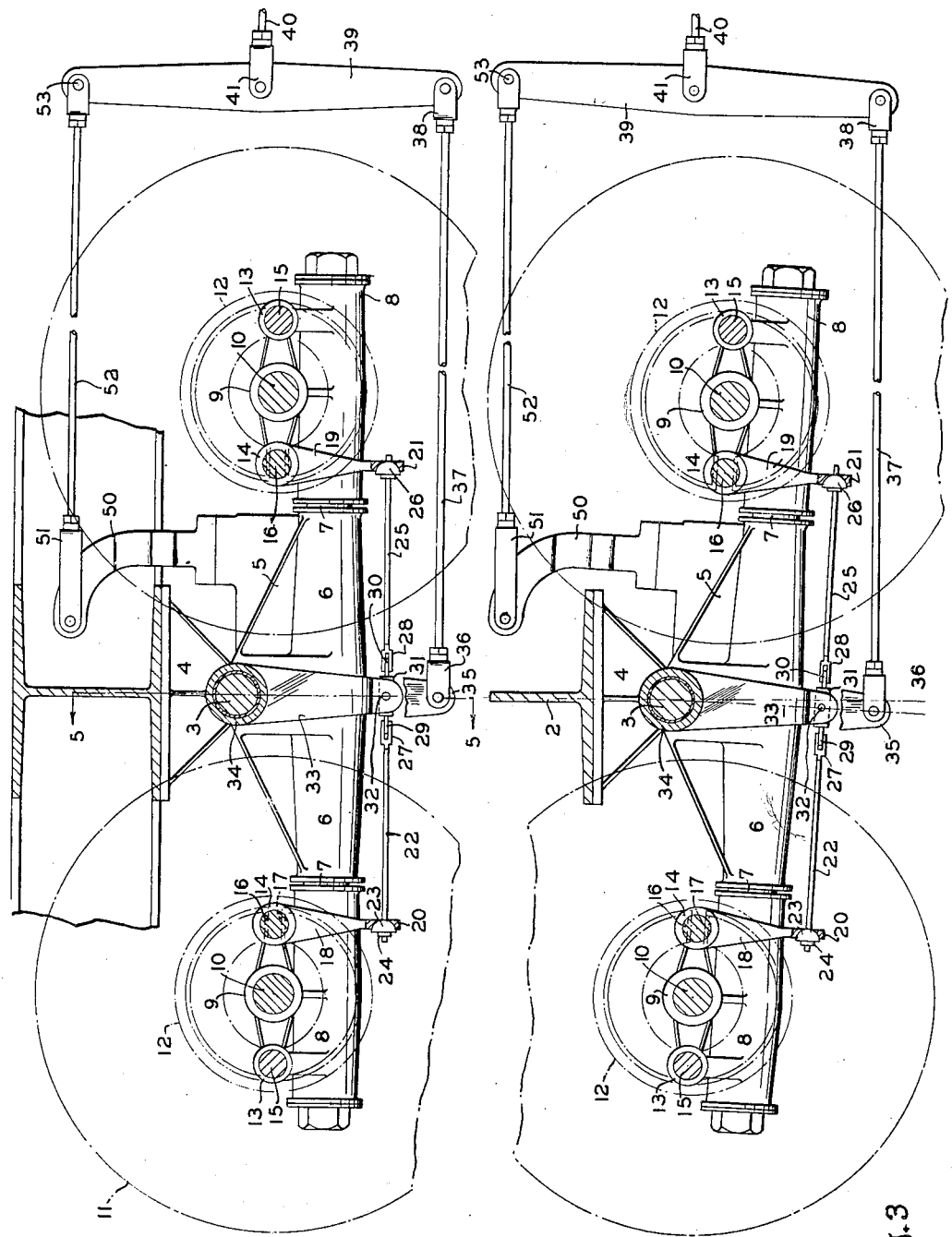
Fig. 2 is an enlarged sectional view taken on a plane indicated by the line 2—2 in Fig. 1, part thereof being shown in elevation for clearness in illustration.
Fig. 3 is a view similar to Fig. 2 showing the operative relation among the parts of the mechanism when the wheels are rocked to a different position from that shown in Fig. 2.
Figure 4:
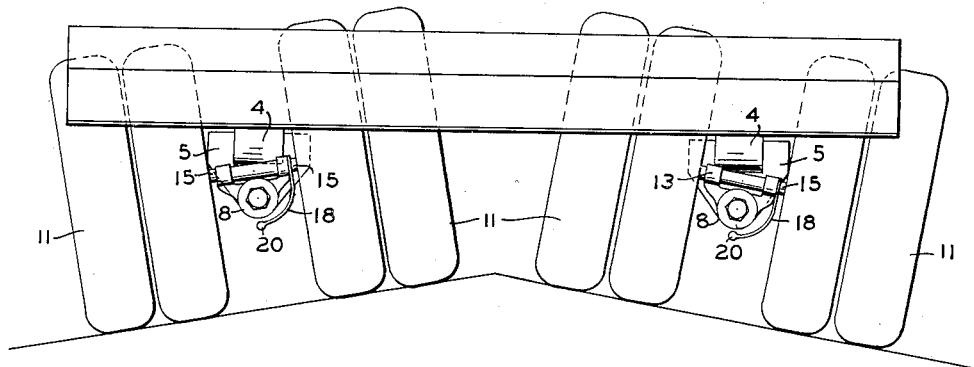
Fig. 4 is a rear elevation of the trailer and mechanism illustrated in Fig. 1.
Figure 5:
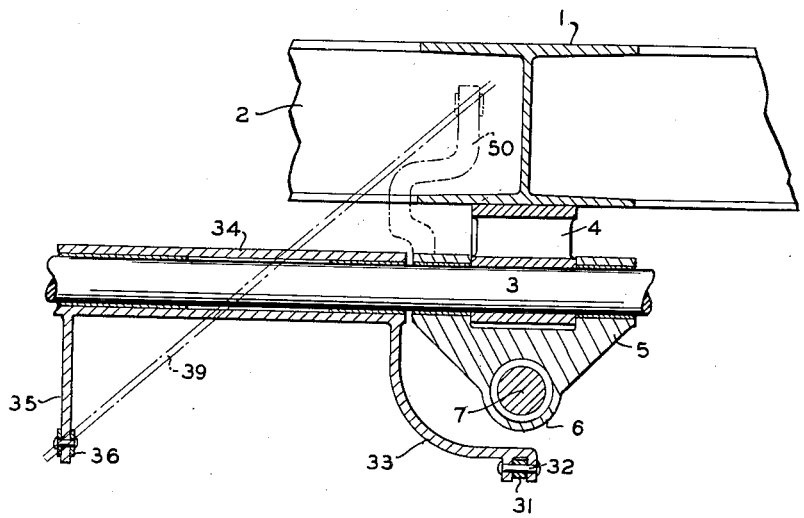
Fig. 5 is a sectional view taken on a plane indicated by the line 5—5 in Fig. 2.

Referring to the drawings, the trailer, shown for purposes of illustration, comprises a frame which has longitudinal sills 1 and a transverse frame member 2 at the rear portion of the frame. The trailer is provided with eight dual-tire wheels which, through the medium of a main transverse shaft 3, support the rear end of the trailer. The shaft 3 extends substantially entirely across the vehicle and is positioned directly beneath the transverse frame member 2, as better illustrated in Figs. 2 and 3. Suitable bracket bearings 4 are secured to the underside of the transverse frame member 2 and have bearing sleeve portions which accommodate certain portions of the shaft 3 for providing a connection between the frame and shaft 3.

Mounted on the transverse shaft 3 for rocking thereabout in a vertical plane are rigid main housings 5, two such housings being provided and arranged to extend fore and aft of the frame, one at each side of the longitudinal center line of the frame. Each main housing 5 has a sleeve portion 6 in which is accommodated a longitudinally extending shaft 7, the shaft 7 extending beyond the housing both fore and aft. Mounted on the extending ends of the shaft 7 are axle supporting housings 8, each of which is arranged for rocking about the shaft 7. Each housing 8, in turn, is provided with a rigid, integral, transverse sleeve 9 which accommodates a wheel axle 10, the wheel axle extending transversely of the trailer beyond both ends of the housing 9.

Mounted on the extending ends of the axles 10 are dual-tire wheels 11, one dual-tire wheel being mounted on each extending end of each axle 10. Each dual-tire wheel, in turn, has a brake which includes a brake drum 12 in which are provided the usual expanding brake shoes. The housing 8 is provided with two transverse bearing sleeves 13 and 14, respectively, the sleeves 13 and 14 extending parallel to the sleeve 9. Mounted in the sleeve 13 of each housing 8 is a pivot 15 which pivotally supports the adjacent ends of the associated brake shoes so that they may be moved to expanded or contracted position. The opposite sleeve 14 of each housing 8 is provided with a brake operating shaft 16 which, at both ends, extends within the corresponding brake drums and is provided at its extending ends with suitable cams 17 for expanding the associated brake shoes consequent upon rocking of the shaft 16 about its axis.

The specific brake mechanism including the drum and shoes are well known and have not been illustrated in detail. They are preferably of the type set forth in United States Letters Patent No. 1,887,042, issued to Charles A. Rogers, on November 8, 1932, and No. 1,905,242, issued to Charles A. Rogers, et al., on April 25, 1933.

For rocking the shaft 16 to apply the associated brakes, a lever 18 is provided, this lever depending from the shaft 16 and at its lower end extending beneath the housing 8 so as to lie in a plane through the longitudinal axis of the housing 8 and normal to the axis of the shaft 16.

Correspondingly, on the forward housing 8 a similar arrangement is provided, the brakes for the forward set of wheels being operated through a transverse rock shaft, similar to the shaft 16, by a depending lever 19 which is corresponding in shape and location relative to its associated housing 8 to the lever 18. The expanding cams for the brakes are so arranged that movement of both levers 18 and 19 in one direction apply the brakes on all wheels and movement of both levers in the opposite direction releases the brakes.

In the form illustrated, the brakes for the rear set of wheels are applied by the lever 18 when it is swung about the axis of the shaft 16 in a counterclockwise direction. The brakes are applied to the forward wheels by swinging the lever 19 in a counterclockwise direction. Thus, for operating the levers 18 and 19 from a single source intermediate the levers, it is necessary that one of the levers, such as the lever 18, be pulled by the mechanism and the other pushed by the mechanism.

The levers 18 and 19, respectively, are provided at their lower ends with spherical sockets 20 and 21. A rigid brake rod 22 is connected with the at their lower ends with spherical sockets 20 and lever 18 through the medium of a ball element 23 which is accommodated in and complementary to the socket 20, the position of the ball element 23 being adjusted longitudinally of the rod 22 by a suitable nut 24. Correspondingly, the lever 19 is operated by a rigid brake rod 25 on the end of which is adjustably arranged a ball element 26. The socket 21 of the lever 19 faces in the opposite direction from the socket 20 of the lever 18 and the ball element 26 is correspondingly oppositely arranged so that it may apply braking pressure to the lever 19 in the direction of compression of the rod 25. The ball and socket connections provided between the rods 22 and 25 with the respective levers 18 and 19 permit a limited universal movement such that compensation is provided for generally longitudinal path of movement of the rods and the arcuate path of movement of the sockets.

The rods 22 and 25 are connected at their adjacent ends to clevis yokes 27 and 28, respectively, the clevis yokes 27 and 28 being arranged to accommodate upright pivots by which they are connected to tongues 29 and 30, respectively, of a block 31. These connections thus permit lateral swinging movement of the rods 22 and 25 about the pivotal axes of the clevis and compensate for rocking of the housing 8. The tongues 29 and 30 are rigid with the block 31 which is connected by a horizontal, transversely extending pivot 32 to a lever 33. The lever 33, in turn, is connected at its upper end to a transversely extending sleeve 34 which is mounted on the shaft 3 for rocking movement about the axis thereof independently of the housing 5. At the end of the sleeve 34 opposite from the lever 33 is a depending lever 35 which is rigid with the sleeve 34 so that the levers 35 and 33 may swing together about the axis of the shaft 3.

Connected to the end of the lever 35 by a suitable clevis 36 is a rigid brake operating rod 37, the rod 37 extending forwardly of the trailer. At its forward end, the rod 37 is connected by a clevis 38 to one end of a semi-floating walking beam 39. Connected to the walking beam 39 between the ends thereof is a brake rod 40, the brake rod 40 being connected at one end to the beam by a clevis 41, and, at its other end, being pivotally connected to a suitable link 42. The link 42 is pivotally connected at one end to a stationary bracket 43 and the opposite end of the link is pivotally connected to one end of a link 44. The opposite end of the link 44 is pivotally connected to a rocking beam 45 which, in turn, is pivotally connected to the end of a piston rod 46 of a pneumatic or vacuum operating cylinder and piston assemblage 47.

The mechanism thus far described is for applying the brakes on four wheels of one of the main longitudinal shafts 7 and a corresponding mechanism is provided for operating the four wheels of the other longitudinally extending shaft 7. Thus, through the rocking beam 45, the links 44, and the links 42, equalized braking pressure is applied to both of the rods 40.

The desired mechanical advantages and braking pressure may be obtained by positioning the pivotal connection between the rods 40 and their corresponding links 42 at the desired distances from the stationary brackets 43. From the structure thus far described, it is apparent that if the end of the walking beam 39, opposite from the clevis 38, is held in a given position, pulling of the rod 40 will swing the lever 35 forwardly of the trailer, thus rocking the sleeve 34 and causing a corresponding forward swinging of the lever 33 which applies the brakes on both the fore and aft sets of wheels of the shaft 7.

If the shaft 7 were fixed in a horizontal position and the axles 10 correspondingly fixed, it would only be necessary to pivotally secure the opposite end of the walking beam 39 to a suitable bracket on the frame of the vehicle and equalized braking pressure would result, as the compensation for lateral rocking of the wheels about the shaft 7 is provided for in the connections between the levers 33 and the levers 18 and 19. It is necessary, however, to compensate for the concurrent rocking of the housing 5 about the transverse main shaft 3 as obviously this rocking is relative to the levers 33 and the levers 35. If, therefore, the opposite end of the rocking beam 39 were fixed in position, rocking of the housing would apply or release the brakes or change tthe starting point of application of braking pressure.

In order to compensate for this rocking action of the housing 5 and thus maintain the brake operating lever 33 free to swing relative to the housing, yet always from the same starting position, the opposite end of the rocking beam 39 is connected to a migrating pivot which is so arranged as to migrate in a fixed relation to the rocking of the housing 5. For providing this migratory pivot, there is mounted on the housing 5 a rigid arm 50, the arm 50 preferably extending upwardly from the housing 5.

Connected to the upper end of the arm 50 by a suitable yoke 51 is a rigid equalizing rod 52, the rod being connected to the arm for swinging movement about a substantially horizontal pivot. The opposite end of the rod 52 is pivotally connected, as indicated at 53, to the opposite end of the rocking beam 39. In the form illustrated, the arm 50 extends the same distance above the axis of the shaft 3 as the lever 35 extends therebelow and the rod 40 is connected to the center of the rocking beam.

If it is desirable for structural reasons, however, to change the relative lengths of the arm 50 and lever 35 and the like, proportional changes may be made in the position of the clevis 30 and pivot 53 from the clevis 41 to provide the desired movements.

Due to the arm 50 and rod 52, the pivotal connection 53 with the walking beam 39 migrates fore and aft of the trailer frame in a fixed relation to the rocking of the housings 5. Consequently, upon rocking of the housing 5 in a given direction, the walking beam 39 swings about its point of connection with the rod 40, and the lever 35, and correspondingly the lever 33, swings in an opposite direction a corresponding amount so that the lever 33 remains in the same relation to the housing 5 without the application of any braking pressure, while at the same time it is movable by the application of force by rod 40. The pivot of the clevis 41 thus remains in fixed position so long as the rod 40 is not moved and the shifting of the levers 33 and 35 by the rocking of the housing 5 and shaft 7, is compensated for in the walking beam 39, due to the migratory action of the pivot 53. Consequently, regardless of the rocked position of the housing 5, the brake applying rod 37 is always in the same condition relative to the application of force to the levers 33 and 35, except when moved by application of force by the rod 40, and will be operated to move and operate the brake only by exerting a pull or push, as the case may be, on the rod 40.

It is apparent, therefore, that regardless of the transverse rocking of the axles 10 and the fore and aft rocking of the housing 5, equalized braking pressure can be applied instantaneously to all eight wheels of the vehicle regardless of the individual rocking of any of the shafts and axles and whether rocked in the same or opposite directions, and regardless of the degree of rocking thereof.

I claim:

1. A brake applying and equalizing mechanism for a vehicle having a wheel supporting member extending longitudinally of the vehicle and being rockable about an axis extending transversely of the vehicle, wheels mounted on the supporting member forwardly and rearwardly of said transversely extending axis, and brakes for said wheels, respectively, said mechanism comprising a lever mounted on the vehicle for swinging movement about said axis relative to and independently of the rocking of the supporting member, means connecting said lever to the brakes for actuating the brakes by the lever consequent upon swinging of said lever to different positions relative to the said support, a walking beam, means connecting one end of the beam to the lever, power applying means connected to the beam between its ends for exerting a force on the beam generally longitudinally of the vehicle, and means connecting the other end of the beam to said supporting member and operative to rock the beam about its point of connection with the power applying means consequent upon rocking of the supporting member and thereby to maintain said lever, in all rocked positions of the support, in a fixed operative relation to the power applying means and also in a fixed operative relation to the brakes except when the lever is operated by said power applying means.

2. In a vehicle having a wheel rockable about a transverse axis which is spaced from the axis of the wheel, a brake mechanism for the wheel, and power applying means for applying braking power to the brake mechanism consequent upon predetermined movement of said means, an equalizing mechanism interposed between said power applying means and braking mechanism for applying the same pressure to the brake for a given movement of said power applying means regardless of the rocked position of said wheel about said transverse axis, said equalizing mechanism comprising a walking beam pivotally connected between its ends to said power applying means, a lever mounted to rock about said transverse axis independently of the rocking of said wheel and operatively connected to the brake mechanism for applying the brake mechanism, and means rockable with said wheel and connected to the opposite end of said walking beam for constraining said lever, through the medium of the beam, from changing its operative relation with the wheel braking mechanism due to rocking of the wheel about said transverse axis while permitting change of the relation of said lever with respect to the wheel braking mechanism by the power applying means through the medium of said walking beam during rocking of said wheel.

3. A brake applying and equalizing mechanism for a vehicle having a pair of wheels mounted on opposite ends of a longitudinally extending supporting member which is rockable about a fixed transverse axis spaced from the axes of the wheels, said mechanism being capable of applying the same braking pressure on the wheels for a given movement of a power applying means regardless of the rocked position of the supporting member about the transverse axis, and comprising a main lever mounted for swinging movement about said transverse axis independently of and relative to the rocking of said longitudinal supporting member about said transverse axis, a brake actuating lever arranged to swing with the support as the support rocks, a rigid member connecting said levers for moving the brake actuating lever in response to movement of the said main lever, a walking beam, a rigid member connecting one end of the walking beam to the main lever for movement in fixed relation to the main lever, said rigid member being pivotally connected to the beam and to the main lever, power applying means pivotally connected to the walking beam in spaced relation to said one end, a migratory member connected to the other end of said walking beam, and means operative to effect migration of said migratory member in a fixed relation to the rocking movement of the longitudinal supporting member about said transverse axis and cooperating with the walking beam to maintain the main lever in fixed operating relation to the power applying means during rocking of the supporting member, and constraining the main lever from changing its position relative to the supporting member due to rocking of the support while permitting the main lever to be changed in position relative to the supporting member by the power applying means during rocking of the support.

4. The combination with a vehicle having forward and rearward wheels rockable about a longitudinal axis and concurrently rockable about a transverse axis positioned between the forward and rearward wheels, brakes for the wheels respectively, and central power applying means on the vehicle and spaced from the said wheels and axis, of brake applying mechanism respective to wheels on opposite sides of the longitudinal axis and comprising rigid non-flexible elongated members pivotally connected together and offset horizontally from the transverse axis and which are connected to the brakes of front and rear wheels so as to move with the wheels when the wheels rock about the transverse axis, and means interposed between said members and the power means in a manner to compensate for movement of said pivotally interconnected members upon rocking of the wheels about said transverse axis.

5. In a vehicle having a transverse shaft, a longitudinally extending shaft supported thereby for rocking movement about the transverse shaft, sets of wheels mounted on the longitudinal shaft for rocking thereabout, said sets of wheels being arranged forwardly and rearwardly of the transverse shaft, brakes respective to said wheels, levers for the forward brakes and rearward brakes and arranged to operate the brakes when swung in a path generally parallel to the longitudinal shaft, a rock lever mounted on said transverse shaft for rocking movement thereabout, rigid members connecting said brake levers to the rock lever and arranged for semi-universal pivotal movement with respect to all the levers to compensate for rocking of the wheels about the longitudinal shaft, a walking beam, means connecting said rock lever to one end of the walking beam, means operatively connecting the opposite end of the walking beam to said longitudinal shaft for rocking the beam in a fixed relation to the rocking of the longitudinal shaft, and power applying means for the brakes and connected to said rocking beam between its ends for applying power to the brakes through the medium of the beam.

6. In a vehicle having a transverse member, a longitudinally extending support supported thereby for rocking movement relative thereto, said longitudinal support extending forwardly and rearwardly from the transverse member, pairs of wheels mounted one pair on each end of the longitudinal support for rocking movement about the longitudinal support, brakes for the wheels respectively, rigid levers for operating the brakes of each pair of wheels, each lever being swingable in an arcuate path substantially in a plane normal to the axis of the associated wheels at all times to operate the associated brakes, a rock lever mounted on said transverse member for swinging movement relative thereto independently of the rocking of the longitudinal support, rigid rods connecting said lever to said brake levers, means rendering the connection of the rods to said levers semi-universal for compensating for lateral rocking of the wheels about said longitudinal support, a second lever rigid with the first lever and mounted for rocking movement about said transverse member independently of said longitudinal support, a walking beam, means connected to the walking beam between its ends for applying braking power thereto, a relatively rigid rod pivotally connected to said second lever and to one end of said walking beam, a second relatively rigid rod pivotally connected at one end to the opposite end of the walking beam, and an element rockable in fixed relation to the support and having one end pivotally connected to the other end of said second rod.

7. In a vehicle having a transverse member, a longitudinally extending member supported by the transverse member for rocking movement relative thereto, said longitudinal member extending forwardly and rearwardly from the transverse member, pairs of wheels mounted on the ends of the longitudinal member for rocking movement about a longitudinal axis, brakes for the wheels respectively, rigid levers for operating the brakes of each pair of wheels, each lever being swingable in an arcuate path substantially in a plane normal to the axis of the associated wheels at all times for operating the associated brakes, each lever depending below the longitudinal member with its end portion substantially at the lateral mid-portion of the longitudinal member when the wheels are in unrocked condition, a rocking sleeve mounted on said transverse member for rocking movement relative thereto and to the longitudinal member, a depending lever on the sleeve having its lower end disposed beneath the longitudinal member and substantially beneath the lateral mid-portion of the longitudinal member and longitudinal mid-portion of the transverse member, rigid rods connected with said lever and with said brake levers by semi-universal joints for compensating for lateral displacement of the wheels due to their rocking about said longitudinal member, a second lever rigid with the sleeve and extending generally parallel to said depending lever, a walking beam, means connected to the walking beam between its ends for applying braking force thereto in a direction generally parallel to the longitudinal member, a rigid member pivotally connected to said second lever of the sleeve and to one end of said walking beam, a second rod pivotally connected at one end to the opposite end of the walking beam, an element rockable with said longitudinal member and extending substantially diametrically oppositely from one of the sleeve levers, and in fixed position relative to the longitudinal member, and having one of its ends pivotally connected to the other end of said second rod.

8. The combination with a vehicle having two sets of wheels, each set comprising relatively forward and rearward wheels at least two of which are rockable about a longitudinal axis and all being concurrently rockable about a transverse axis positioned between the forward and rearward wheels, brakes for the wheels respectively and central power applying means on the vehicle spaced from the said wheels and axes, of brake applying and equalizing mechanism consisting entirely of rigid, non-flexible parts operatively connecting the central power means and the brakes and operative for applying equalized braking pressure to the brakes of said wheels in any rocked position of the wheels about said longitudinal axis and about said transverse axis upon operation of said central power applying means.

9. A brake-applying mechanism for multi-wheeled vehicles in which two pairs of transversely interconnected wheels are supported for rocking movement on a frame which pivots about an axis extending transverse to the direction of movement of the vehicle and situated between the two pairs, said wheels having brakes, said mechanism comprising members connecting brakes of wheels of both pairs in fore and aft directions and movable with the wheels and disposed in horizontally offset relationship to the transverse rocking axis, operating means for said members so supported as to be unaffected by the rocking motion of the frame, and a compensating connection consisting of non-flexible members pivoted together and operatively disposed between the operating means and said members.

HUGH L. ROGERS.